H. WENDOVER.
Harrows.

No. 137,520. Patented April 1, 1873.

Witnesses:

Inventor

UNITED STATES PATENT OFFICE

HENRY WENDOVER, OF NORWAY, NEW YORK.

IMPROVEMENT IN HARROWS.

Specification forming part of Letters Patent No. 137,520, dated April 1, 1873; application filed February 15, 1873.

*To all whom it may concern:*

Be it known that I, HENRY WENDOVER, of Norway, Herkimer county, New York, have invented certain new and useful Improvements in Folding Harrows, of which the following is a specification, reference being had to the accompanying drawing.

Nature and Objects of the Invention.

The invention relates to a series of bars, the ends of which are connected by plates pivoted together midway between the bars, so that they can be rolled or folded together. The under side of the bars may be provided with teeth, and the front with a slide-rod, to which the propelling power may be attached. The object of the invention is to provide an efficient and convenient form of harrow or drag.

Description of the Accompanying Drawing.

Figure 1:
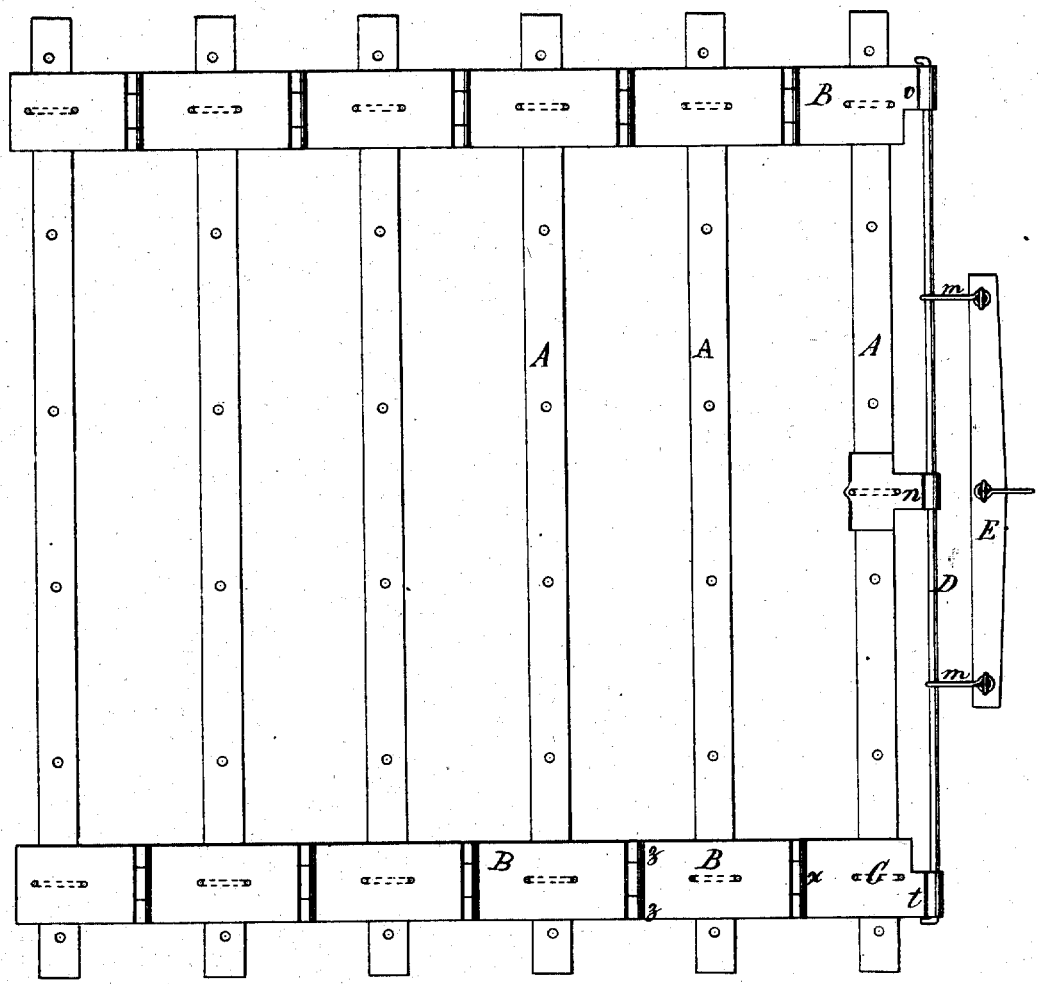
Figure 2:
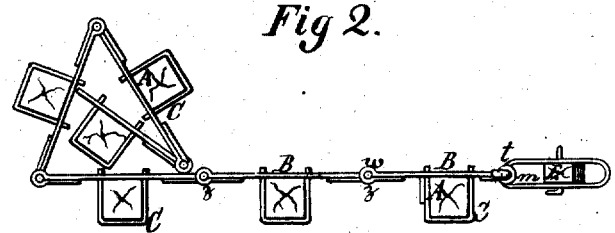

Figure 1 is a plan or top view of a device embodying the elements of the invention. Fig. 2 is a side elevation of same, showing the device partly open and partly folded.

General Description.

A in the accompanying drawing is a bar of wood, or other suitable material, provided with the plate B, connected on either side of the bars A by means of the staple C, or in any other suitable manner. These plates are provided with loops or sleeves $z$ and $x$, which fit interchangeably, and are attached by the pin $w$, so that the plates are hinged and can have an upward or downward movement. If desired, the bars A may be provided on their under side with harrow-teeth or other equivalent device, or the device may be used without them as a drag. The bar A is provided with the slide-rod D, which is connected at its center and ends to the bar by the loops $v$ and $t$ in the front of the plates B and $n$ on the bar, or in any other suitable manner, and the rod is connected by the links $m$, one of which is on each side of the loop $n$, to the swingle-tree E, which plays freely from side to side upon the rod D. By the arrangement of the plates in a line or flat chain upon the bars A, and from the fact that such plates are hinged at a point midway between the bars, any lateral movement of the bars is prevented, and they may be folded without danger of splitting the bars.

Operation.

The propelling power is attached to swingle-tree and the device drawn over the ground to be operated upon. Whenever the teeth become choked it is only necessary to raise the rear of the device, and allow the obstructions to drop off. When it is desired to use but a portion of the device a number of the bars A may be folded over those in front, the teeth or bars of which only come in contact with the ground.

To transport the device to or from the ground on which it is to be used, it is only necessary to reverse it so that the side provided with teeth is uppermost.

Claim.

What I claim as my invention, and desire to secure by Letters Patent, is—

The folding harrow or drag, consisting of the bars A provided on their surface with the plates B, hinged at a point midway between the bars A, substantially as shown and described.

In testimony that I claim the foregoing improvement in folding harrows, as above described, I have hereunto set my hand and seal this 3d day of February, 1873.

HENRY WENDOVER. [L. S.]

Witnesses:
JAS. M. BROWN,
V. R. TOMPKINS.